US012573170B2

(12) United States Patent
Zhang et al.

(10) Patent No.: US 12,573,170 B2
(45) Date of Patent: Mar. 10, 2026

(54) UNSUPERVISED VIDEO SEGMENT CLUSTERING AND BOUNDARY POSITIONING

(71) Applicant: International Business Machines Corporation, Armonk, NY (US)

(72) Inventors: Li Bo Zhang, Beijing (CN); Zhe Yan, Beijing (CN); Rong Zhao, Beijing (CN); Li Li Guan, Beijing (CN); Hao Xiang Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 18/469,688

(22) Filed: Sep. 19, 2023

(65) Prior Publication Data

US 2025/0095328 A1 Mar. 20, 2025

(51) Int. Cl.
| | |
|---|---|
| *G06V 10/44* | (2022.01) |
| *G06F 40/30* | (2020.01) |
| *G06V 10/74* | (2022.01) |
| *G06V 10/762* | (2022.01) |
| *G06V 20/40* | (2022.01) |

(52) U.S. Cl.
CPC .............. *G06V 10/44* (2022.01); *G06F 40/30* (2020.01); *G06V 10/761* (2022.01); *G06V 10/762* (2022.01); *G06V 20/46* (2022.01)

(58) Field of Classification Search
CPC ................................. G06V 10/44; G06F 40/30
See application file for complete search history.

(56) References Cited

U.S. PATENT DOCUMENTS

| | | | | |
|---|---|---|---|---|
| 9,367,615 | B2 * | 6/2016 | Kocks .................. | G06F 16/9024 |
| 9,961,380 | B1 * | 5/2018 | Hwang .............. | H04N 21/4667 |
| 10,748,008 | B2 | 8/2020 | Chang et al. | |
| 11,659,217 | B1 * | 5/2023 | Mahyar ............ | H04N 21/23418 |
| | | | | 725/116 |
| 2012/0105654 | A1 * | 5/2012 | Kwatra ..................... | G06T 3/00 |
| | | | | 348/208.4 |
| 2015/0331951 | A1 * | 11/2015 | Wang .................. | G06F 16/2457 |
| | | | | 707/722 |
| 2017/0024614 | A1 * | 1/2017 | Sanil ....................... | G06F 16/70 |
| 2019/0236371 | A1 | 8/2019 | Boonmee et al. | |
| 2019/0384987 | A1 * | 12/2019 | Li .......................... | G06F 16/71 |

(Continued)

FOREIGN PATENT DOCUMENTS

| | | |
|---|---|---|
| CN | 112910961 | 11/2022 |
| CN | 119669515 A | 3/2025 |

(Continued)

*Primary Examiner* — Kevin Ky
(74) *Attorney, Agent, or Firm* — Patterson + Sheridan, LLP

(57) ABSTRACT

Method and apparatus for video processing. A plurality of videos are accessed. An index is generated based on one or more key frames and one or more video features extracted from the plurality of video. A user input is processed to identify user intentions. The index is filtered to identify a plurality of candidate key frames based on the user intentions. A recommended video is generated based on the plurality of candidate key frames, further comprising selecting one or more additional frames based on processing the plurality of candidate key frames using one or more clustering operations, and aggregating the plurality of candidate key frames and the one or more additional frames.

20 Claims, 5 Drawing Sheets

(56) References Cited

U.S. PATENT DOCUMENTS

| | | | |
|---|---|---|---|
| 2020/0372294 A1 | 11/2020 | Koval et al. | |
| 2021/0142127 A1* | 5/2021 | Lee | G06F 18/217 |
| 2021/0335391 A1* | 10/2021 | Sheng | G11B 27/031 |
| 2022/0406030 A1* | 12/2022 | Zheng | G06V 10/454 |
| 2023/0144027 A1* | 5/2023 | Solmaz | G06F 18/22 |
| | | | 715/719 |
| 2023/0396778 A1* | 12/2023 | Chen | H04N 19/167 |
| 2023/0419557 A1* | 12/2023 | Yoon | H04N 19/70 |
| 2025/0095328 A1* | 3/2025 | Zhang | G06V 20/47 |
| 2025/0200113 A1* | 6/2025 | Kim | G06F 16/9038 |

FOREIGN PATENT DOCUMENTS

| | | | |
|---|---|---|---|
| WO | 2017000465 A1 | 1/2017 | |
| WO | 2021190078 A1 | 9/2021 | |

* cited by examiner

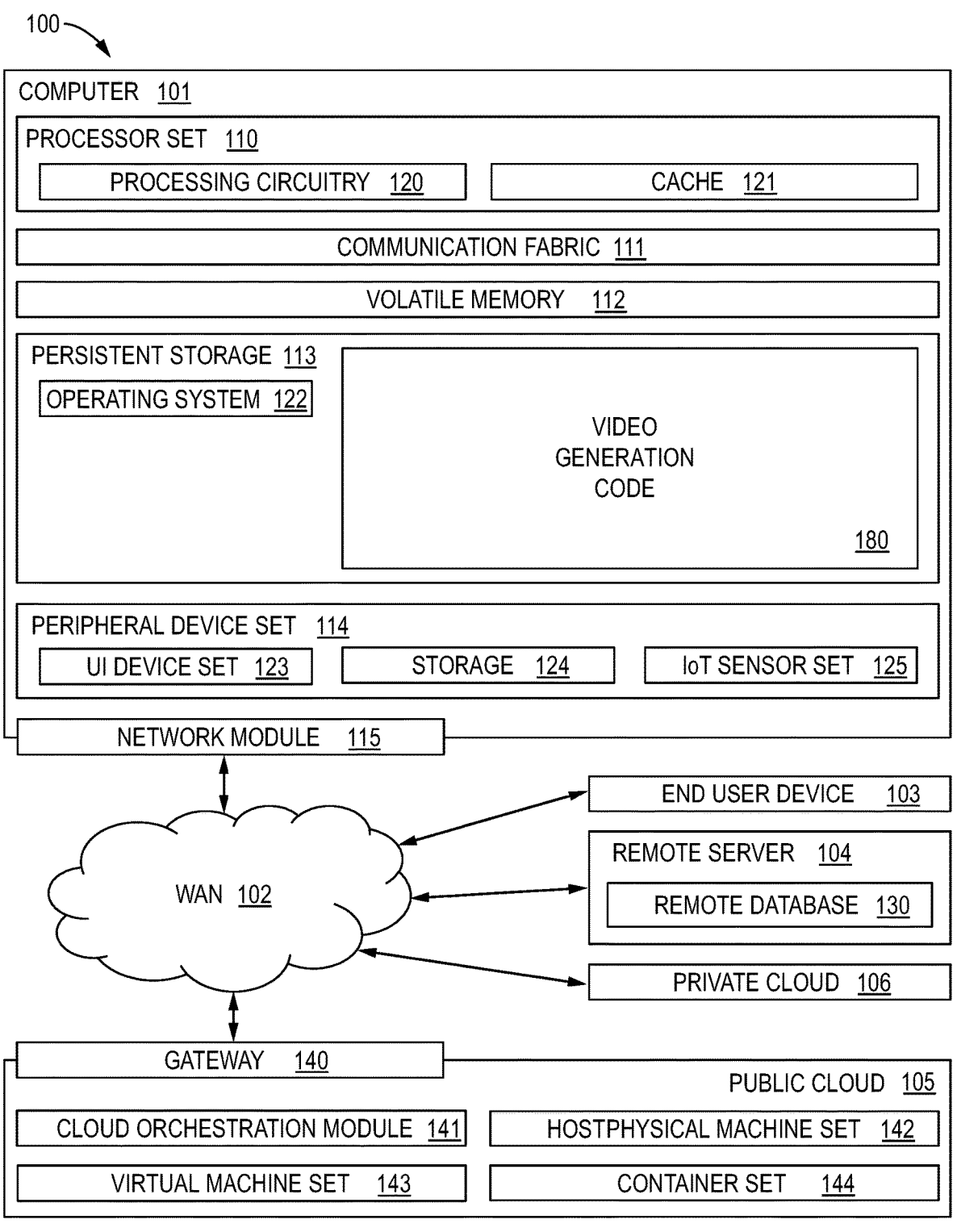

100

COMPUTER   101

PROCESSOR SET   110

PROCESSING CIRCUITRY   120

CACHE   121

COMMUNICATION FABRIC   111

VOLATILE MEMORY   112

PERSISTENT STORAGE   113

OPERATING SYSTEM   122

VIDEO GENERATION CODE

180

PERIPHERAL DEVICE SET   114

UI DEVICE SET   123

STORAGE   124

IoT SENSOR SET   125

NETWORK MODULE   115

WAN   102

END USER DEVICE   103

REMOTE SERVER   104

REMOTE DATABASE   130

PRIVATE CLOUD   106

GATEWAY   140

PUBLIC CLOUD   105

CLOUD ORCHESTRATION MODULE   141

HOSTPHYSICAL MACHINE SET   142

VIRTUAL MACHINE SET   143

CONTAINER SET   144

*FIG. 1*

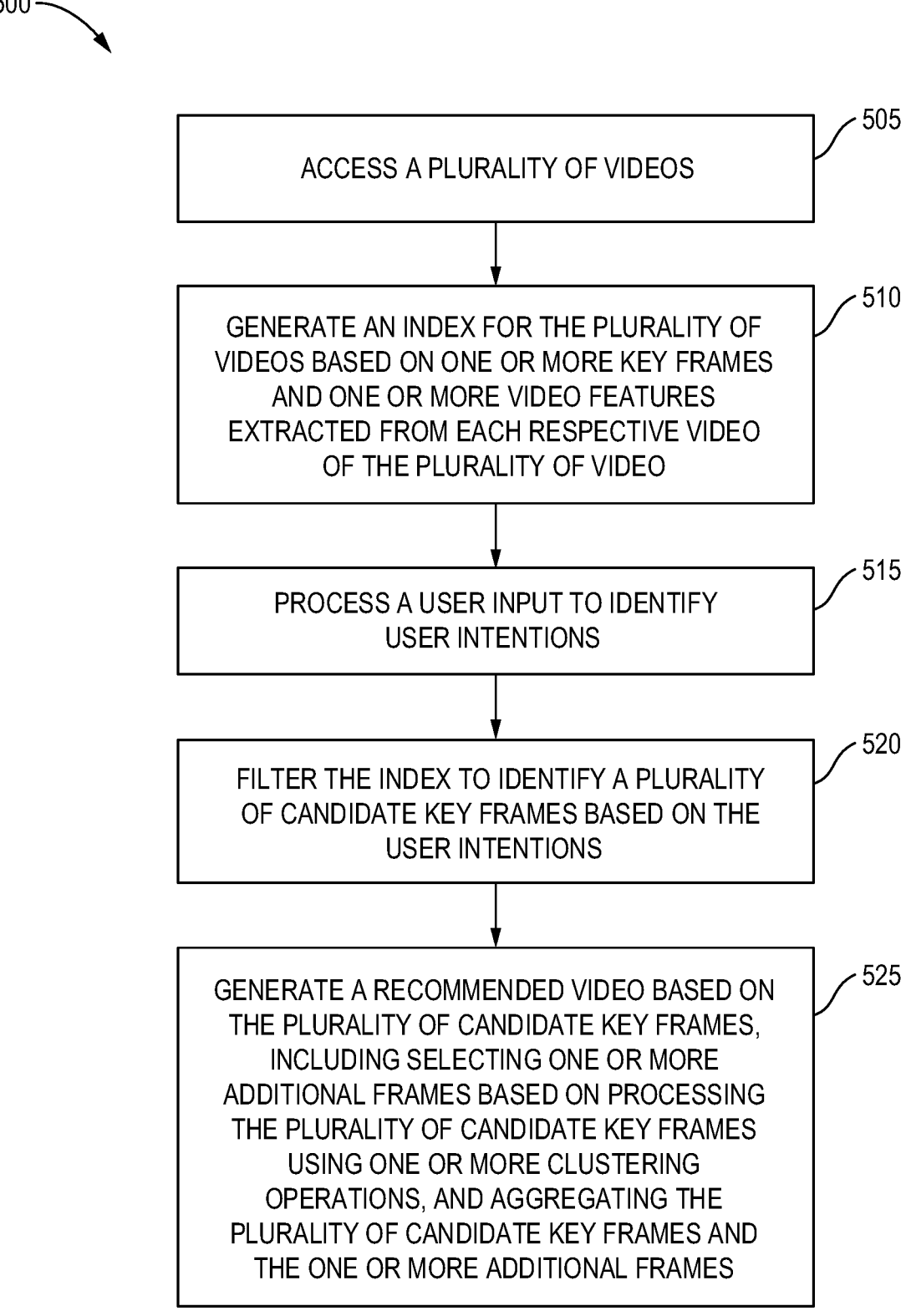

500

ACCESS A PLURALITY OF VIDEOS                                    505

GENERATE AN INDEX FOR THE PLURALITY OF
VIDEOS BASED ON ONE OR MORE KEY FRAMES
AND ONE OR MORE VIDEO FEATURES
EXTRACTED FROM EACH RESPECTIVE VIDEO
OF THE PLURALITY OF VIDEO                                       510

PROCESS A USER INPUT TO IDENTIFY
USER INTENTIONS                                                515

FILTER THE INDEX TO IDENTIFY A PLURALITY
OF CANDIDATE KEY FRAMES BASED ON THE
USER INTENTIONS                                                520

GENERATE A RECOMMENDED VIDEO BASED ON
THE PLURALITY OF CANDIDATE KEY FRAMES,
INCLUDING SELECTING ONE OR MORE
ADDITIONAL FRAMES BASED ON PROCESSING
THE PLURALITY OF CANDIDATE KEY FRAMES
USING ONE OR MORE CLUSTERING
OPERATIONS, AND AGGREGATING THE
PLURALITY OF CANDIDATE KEY FRAMES AND
THE ONE OR MORE ADDITIONAL FRAMES                              525

*FIG. 5*

UNSUPERVISED VIDEO SEGMENT CLUSTERING AND BOUNDARY POSITIONING

BACKGROUND

The present disclosure relates to video processing, and more specifically, to indexing, clustering, and positioning video frames based on a user's input.

Video has become increasingly important for a wide variety of people. Millions of videos are uploaded across various platforms every day, which may include user-generated short clips posted on social media platforms as well as professionally produced videos created for entertainment, education, and/or business purposes (such as surgical operation videos for medical instruction, how-to-use guidance videos for product demonstrations or software tutorials).

With the considerable increase in the volume of video content available, the ability to accurately identify similar video content based on user queries has become increasingly important for both content creators and users. For example, factory technicians relying on instructional videos, which may contain significant background noise from machinery, may search through numerous videos to find guidance on a specific technical area. Similarly, doctors may navigate vast collections of surgical operation videos, typically created without audio, to find specific procedures like an open skull operation. In the area of software development, many demo videos (e.g., how-to-use guidance videos) are created to teach customers how to use different features within a software. However, upon software launch, a customer may only be interested in videos regarding a specific feature.

The conventional methods, which rely on basic keyword tagging or content analysis, are insufficient to satisfy the need for effective and precise video content search based on user queries.

SUMMARY

One embodiment presented in this disclosure provides a method, including accessing a plurality of videos, generating an index for the plurality of videos based on one or more key frames and one or more video features extracted from each respective video of the plurality of videos, processing a user input to identify user intentions, filtering the index to identify a plurality of candidate key frames based on the user intentions, and generating a recommended video based on the plurality of candidate key frames, where generating the recommend video further comprises selecting one or more additional frames based on processing the plurality of candidate key frames using one or more clustering operations, and aggregating the plurality of candidate key frames and the one or more additional frames. One advantage provided by such an embodiment is clustering similar video frames guided by user inputs.

In another embodiment, one or more of the following features may be included. In one embodiment, processing a user input to identify user intentions may comprise converting the user input into textual data, and processing the textual data to predict the user intentions using natural language processing (NLP) techniques. Such an embodiment enhances the system's capability to accurately identify a user's intentions, leading to more efficient video clustering and aggregation.

In one embodiment, the user input may comprise at least one of a textual query, an audio file, an image, or a video file, and where the user intentions are presented as a row vector.

Such an embodiment that represents a user's intentions as row vectors streamlines the integration with clustering algorithms, thereby improving the efficiency of identifying candidate key frames.

In one embodiment, selecting one or more additional frames based on processing the plurality of candidate key frames using one or more clustering operations may comprise, for each candidate key frame from a respective candidate video, identifying the one or more additional frames from the respective candidate video upon determining that a similarity between each of the one or more additional frames and the candidate key frame exceeds a defined threshold, and clustering the candidate key frame with the one or more additional frames from the respective candidate video to generate a video clip. Such an embodiment ensures that the system captures all frames relevant to a user's intentions, thereby generating a cohesive and continuous video clip rather than isolated frames.

In one embodiment, the one or more key frames for each respective video of the plurality of videos may be determined by dividing each respective video into a plurality of frames, extracting the one or more video features from each respective frame of the plurality of frames, clustering the plurality of frames based on similarities between different frames of the plurality of frames, where the similarities are determined based on the one or more video features extracted from each respective frame, and identifying one or more cluster centers as the one or more key frames to present each respective video. Such an embodiment that pre-identifies key frames for each video enables faster and more accurate searches aligned with a user's intentions.

In one embodiment, the one or more video features extracted from each respective video may comprise at least one of a global feature, or a local feature. Such an embodiment that generates an index for the plurality of videos based on one or more global or local video features offers a quick reference to the important features of videos in response to a user's inputs, thereby expediting the search process.

In one embodiment, the method may further comprise, prior to generating the recommended video based on the plurality of candidate key frames, recommending one or more leading video features from the one or more video features extracted from each respective video based on at least in part on the user intentions. In some embodiments, the one or more additional frames may be selected based on the one or more recommended leading video feature. In some embodiments, the one or more recommended leading video features may comprise at least one of (i) color, (ii) brightness, (iii) texture, (iv) gray scale, (v) object tracing, (vi) scale-invariant feature transform (SIFT), or (vii) image semantics data. Such embodiments offer enhanced flexibility and visibility, allowing a user to make informed decision regarding leading video features consistent with his preferences and intentions.

In one embodiment, the method may further comprise, prior to generating the recommended video based on the plurality of candidate key frames, modifying the plurality of candidate key frames, where modifying the plurality of candidate key frames may comprise removing a candidate key frame of the plurality of candidate key frames upon determining that the candidate key frame is an outlier among the plurality of candidate key frames, and adding a key frame of the one or more key frames within the index upon determining that the key frame is visually similar to one candidate key frame of the plurality of candidate key frames. Such an embodiment improves the accuracy of video recommendations by refining the candidate key frames.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs that, when executed by the one or more computer processors, perform an operation in accordance with one or more of the above methods.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 depicts an example computing environment for the execution of at least some of the computer code involved in performing the inventive methods.

FIG. 5 depicts a flow diagram depicting an example method for user-driven video segment clustering and boundary positioning, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 2:
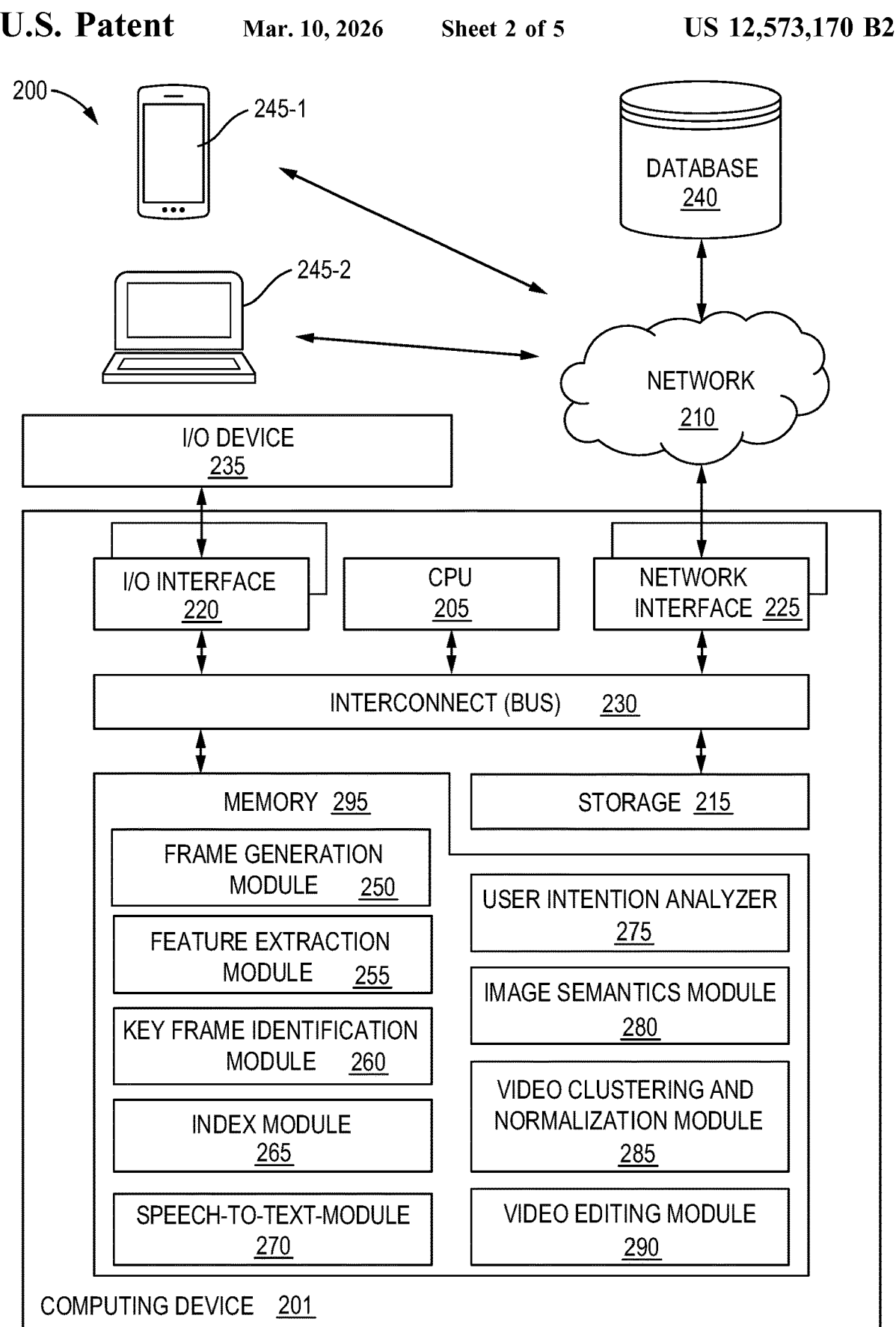
FIG. 2 depicts an example environment for video processing, according to some embodiments of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments herein describe a method or system for unsupervised user-driven video segment clustering and boundary positioning. As used here, "user-driven" may refer to the method's or system's capability to adapt and/or respond to users' specific inputs or requirements. As used here, "user-driven" video segment clustering may refer to the process of grouping/clustering similar video segments (also referred to in some aspects as video frames) guided by user inputs. As used here, "user-driven" video segment boundary positioning may refer to the process of determining boundaries within grouped video segments (also referred to in some aspects as video frames) directed by user inputs.

For example, in one embodiment, the user inputs may be provided in a variety of formats, such as textual queries, audio files, images, or video files. The user inputs may be converted into textual data, and processed using Natural Language Processing (NLP) techniques to identify the user's intentions. Based on the identified user intentions, the system may filter an index created for key frames to identify a set of candidate key frames. In one embodiment, the index created for key frames may include all key frames extracted from each video, along with their respective video features (e.g., Local Binary Pattern (LBP) values, RGB vector, HSV vector, etc.). In some embodiments, the set of candidate key frames may be selected based on the alignment between their features and the user's specified intentions. Once the candidate key frames have been identified, the system may proceed to perform clustering operations on the other frames from each candidate video, guided by the user's intentions. For example, in one embodiment, the system may apply one or more clustering algorithms to the other frames (e.g., frames that are not initially identified as candidate key frames) from each candidate video, treating the candidate key frames as the center points for potential clusters. By comparing the similarity between each of the other frames and its respective candidate key frame based on one or more video features (e.g., Local Binary Pattern (LBP) values, RGB vector, HSV vector, etc.), the system may determine whether each of the other frames should be grouped together with its respective candidate key frame. In some embodiments, the clustering process may be repeated for all frames in each candidate video, generating a number of clusters. Following this, the system may then proceed to identify video segment boundaries for each cluster of frames. For example, in one embodiment, the system may delete frames falling outside each cluster and/or not exceeding a predefined similarity threshold, reorder the remaining frames within each cluster (e.g., based on a defined criteria or following the original order in the video), and generate a continuous clip by concatenating these ordered frames. Finally, the system may generate a recommended video by aggregating the continuous clip from each cluster, where the content of the recommended video is closely aligned with the user's intentions.

FIG. 1 depicts an example computing environment for the execution of at least some of the computer code involved in performing the inventive methods.

Computing environment 100 contains an example of an environment for the execution of at least some of the computer code involved in performing the inventive methods, such as video generation code 180. In addition to video generation code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and video generation code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in video generation code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in video generation code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts an example environment 200 for video processing, according to some embodiments of the present disclosure. In the illustrated example, the environment 200 includes one or more computing devices 201 for video processing, a database 240, and one or more user devices 245-1, 245-2. In some embodiments, one or more of the illustrated devices may be a physical device or system. In other embodiments, one or more of the illustrated devices may be implemented using virtual devices, and/or across a number of devices.

In the illustrated example, the computing device 201, the database 240, and the user devices 245-1, 245-2, are remote from each other and are communicatively coupled to each other via a network 210. That is, the computing device 201, the database 240, and the user devices 245-1, 245-2, may each be implemented using discrete hardware systems. The network 210 may include or correspond to a wide area network (WAN), a local area network (LAN), the Internet, an intranet, or any combination of suitable communication mediums that may be available, and may include wired, wireless, or a combination of wired and wireless links. In some embodiments, the computing device 201, the database 240, and the user devices 245-1, 245-2, may be local to each other (e.g., within the same local network and/or the same hardware system), and communicate with one another using any appropriate local communication medium, such as a local area network (LAN) (including a wireless local area network (WLAN)), hardwire, wireless link, or intranet, etc.

In the illustrated example, the database 240 comprises a plurality of videos, which may take a variety of formats. For example, the database 240 may contain short videos (e.g., vlogs, commercial advertisements) and/or long videos (e.g., movies, documentaries, TV shows). The content in the database 240 may include user-generated videos (e.g., social media users) and/or videos produced by professional companies. The database 240 may similarly store videos created for a wide variety of purposes, such as education (e.g., surgery videos, college lectures, seminars, speeches, online courses, corporate training videos), entertainment (e.g., movies, TV shows, documentaries, music videos, vlogs), and/or business promotion (e.g., commercial advertisements, product demonstration videos, how-to-use guidance videos). The content of the stored videos may vary significantly, including but not limited to animation, live-action, 3D video, slow-motion, time-lapse, immersive 360-degree, and mixed media, among other formats.

In the illustrated example, the user devices 245-1, 245-2, serve as the interface between a user and the computing device 201. The user devices 245-1, 245-2, may be used by a user to interact with the computing device 201, such as by transmitting the user's inputs (which may include the user's preferences, requirements, search criteria, interested topics/concepts, and the like) to the computing device 201, receiving outputs from the computing device 201, and/or displaying the outputs to the user. In one embodiment, the outputs of the computing device 201 may include a full video generated by aggregating and/or reordering similar video frames. The output video may present a continuous sequence of scenes that align with the user's inputs. In some embodiments, the computing device 201 may return clusters of similar video frames or clips instead of a single, continuous video, and offer users the option to select content that matches their input criteria.

In some embodiments, the user devices 245-1, 245-2, may also be responsible for facilitating feedback from the user. For example, after reviewing the outputs from the computer devices, depending on the type of the outputs, the user may rate the output video, save the relevant clips, and/or adjust requirements or search criteria within user inputs. The client devices may send the feedback to the computing device 201 to further refine and personalize the video processing operations.

The user's inputs may be provided in various formats. In one embodiment, the user may enter specific search terms or choose certain preferences using the user devices, and transmit the (e.g., textual) queries to the computing device 201 for further processing. In some embodiments, the user may provide the inputs by sending an audio command, or uploading an image, an audio file, or a video file to the computing device 201.

In some embodiments, the user devices 245-1, 245-2, may take a variety of forms, such as desktop computers, laptop computers, tablet computers, smart phones, smart watches, or other devices that can be used to interface with the computing device 201 via the network 210.

In the illustrated example, the computing device 201 is capable of accessing, retrieving, and editing the videos stored in the database 240. Although depicted as a physical device, in embodiments, the computing device 201 may be implemented using a virtual device(s), and/or across a number of devices (e.g., in a cloud environment). The computing device 201 may be connected to the user devices 245-1, 245-2 through the network 210, enabling two-way communication. Through the network 210, the computing device 201 may receive user inputs from the user devices 245-1, 245-2. The computing device 201 may process these inputs to perform operations such as video segmentation, indexing, clustering, and/or boundary positioning, and send the output back to the user devices for display.

In the illustrated example, the computing device 201 may store its generated results or analyses in the database 240 and/or the local storage 215. For example, in one embodiment, the computing device 201 may divide videos into individual frames, and process each frame to extract one or more video features. The features may include characteristics of videos, such as color, texture, gray scale, number of depicted objects, object descriptions, among others. In some embodiments, the computing device 201 may generate metadata for each frame based on these video features. The metadata (also referred to in some embodiments as framemeta) (e.g., 315 of FIG. 3) may include one or more video features and their corresponding values for each frame, serving as a comprehensive reference for further comparison and analysis. The information within the metadata may include (but is not limited to) a video file identifier (e.g., file_id), a transformed frame identifier (e.g., frame_id), texture patterns, the number of depicted objects (e.g., num_obj), a description of objects identified in the frame (also referred to in some embodiments as image semantic description) (e.g., obj_des), local binary pattern (LBP) values (e.g., LBP_val), red, green, blue (RGB)vector(s) or value(s) (e.g., RGB_vec), hue, saturation, value (HSV) vector(s) or value(s) (HSV_vec), and/or hash values of the frame (e.g. hash_array). The computing device 201 may save the individual frames, along with their corresponding metadata, into the database 240 and/or the local storage 215. This operation may enable quick and efficient search and retrieval of both the visual content (e.g., the video frames) and the analytical data (e.g., metadata) when new user inputs are received without incurring substantial computational expense.

In some embodiments, the computing device 201 may extract key frames based on the similarity in metadata, and index the extracted key frames for further efficient search and retrieval. The computing device 201 may save the extracted key frames for each video, along with the index, into the database 240 and/or the local storage 215 for further comparison and analysis when user inputs are received.

In some embodiments, the computing device 201 may process user inputs received from the user devices (e.g., 245-1, 245-2) to identify the user's intentions (which may include the user's preferences, requirements, search criteria, interested topics/concepts, and the like). Based on the identified user's intentions, the computing device 201 may filter the index to identify a set of candidate key frames based on the corresponding metadata associated with each frame. The computing device 201 may use the candidate key frames as center points, and apply clustering algorithms to other frames (e.g., frames not identified as candidate key frames), which may include both key frames and non-key frames. The clustering algorithms may determine whether each of the other frames is sufficiently similar to a given candidate frame (e.g., center point) based on the metadata of each frame, where sufficiently similar frames may be grouped together. Using the clustering operation, the computing device may generate a number of clusters, where each cluster represents a group of video frames that are sufficiently similar to one of the candidate key frames, and are also likely to be closely relevant to the user's specified intentions. In some embodiments, the computing device 201 may store the generated clusters in the database 240 and/or the local storage 215 for further processing.

In some embodiments, the computing device 201 may perform boundary positioning for each cluster of frames. For example, the computing device 201 may delete frames outside of a defined threshold distance of each cluster center, reorder the frames within a threshold distance of each cluster center, and/or generate continuous clips for each individual cluster. In some embodiments, the frames within a specific cluster (e.g., with a specific candidate key frame as the center point) are from the same video. In some embodiments, the clustering operations may be conducted at least in part on the video file identifiers (e.g., file_id). That is, when assessing the similarity between different frames, the video file identifier may be considered to ensure that frames within the same cluster are from the same video as their respective center point (e.g., the candidate key frame). In some embodiments, after the clustering operations are complete, the identified frames within each cluster may be reordered in accordance with their timestamp or time sequence in the original video. The sorted sequence of frames may then be used to produce a continuous video clip. The reorder process ensures that each of the clips maintains the original sequence of context from the source video.

In some embodiments, the computing device 201 may combine these generated clips to create a full video, and deliver it as a response to the user inputs. In some embodiments, the full video may include multiple continuous clips, each generated from a respective cluster of frames. In some embodiments, these individual video clips may all be derived from the same video, and therefore the full video may represent different segments of the original video. In some embodiments, these individual video clips may come from different videos, and the created full video may combine segments from various video sources. In some embodiments, the response may be sent back to the user devices (e.g., 245-1, 245-2) over the network 210, allowing the user to view the generated video that accurately reflects their specified intentions within their inputs. In some embodiments, besides being sent back to the user devices for immediate viewing, the response may also be saved into the database 240 and/or the local storage 215 for future reference. The practice of storing responses may aid further analysis and response generation (and substantially reduce computational expense) when similar user inputs are received, therefore optimizing the system's operations for recurring user inputs. Additionally, in some embodiments, the user may rate the response and/or provide feedback for the response, such as rating the video's relevance. The user's feedback, along with the saved response, may then be used to further improve the accuracy and efficiency of the system.

In the illustrated example, the computing device 201 includes a CPU 205, memory 295, storage 215, one or more network interfaces 225, and one or more I/O interfaces 220. In the illustrated embodiment, the CPU 205 retrieves and executes programming instructions stored in memory 295, as well as stores and retrieves application data residing in storage 215. The CPU 205 is generally representative of a single CPU and/or GPU, multiple CPUs and/or GPUs, a single CPU and/or GPU having multiple processing cores, and the like. The memory 295 is generally included to be representative of a random access memory. Storage 215 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 235 (such as keyboards, monitors, etc.) are connected via the I/O interface(s) 220. Further, via the network interface 225, the computing device 201 can be communicatively coupled with one or more other devices and components (e.g., database 240, user devices 245-1, 245-2) via the network 210, which may include the Internet, local network(s), and the like). As illustrated, the CPU 205, memory 295, storage 215, network interface(s) 225, and I/O interface(s) 220 are communicatively coupled by one or more interconnect buses 230.

In the illustrated embodiment, the memory 295 includes a frame generation module 250, a feature extraction module 255, a key frame identification module 260, an index module 265, a speech-to-text module 270, a user intention analyzer 275, an image semantics module 280, a video clustering and normalization module 285, and a video editing module 290. Although depicted as a discrete component for conceptual clarity, in some embodiments, the operations of the depicted component (and others not illustrated) may be combined or distributed across any number of components. Further, although depicted as software residing in memory 295, in some embodiments, the operations of the depicted components (and others not illustrated) may be implemented using hardware, software, or a combination of hardware and software.

Figure 3:
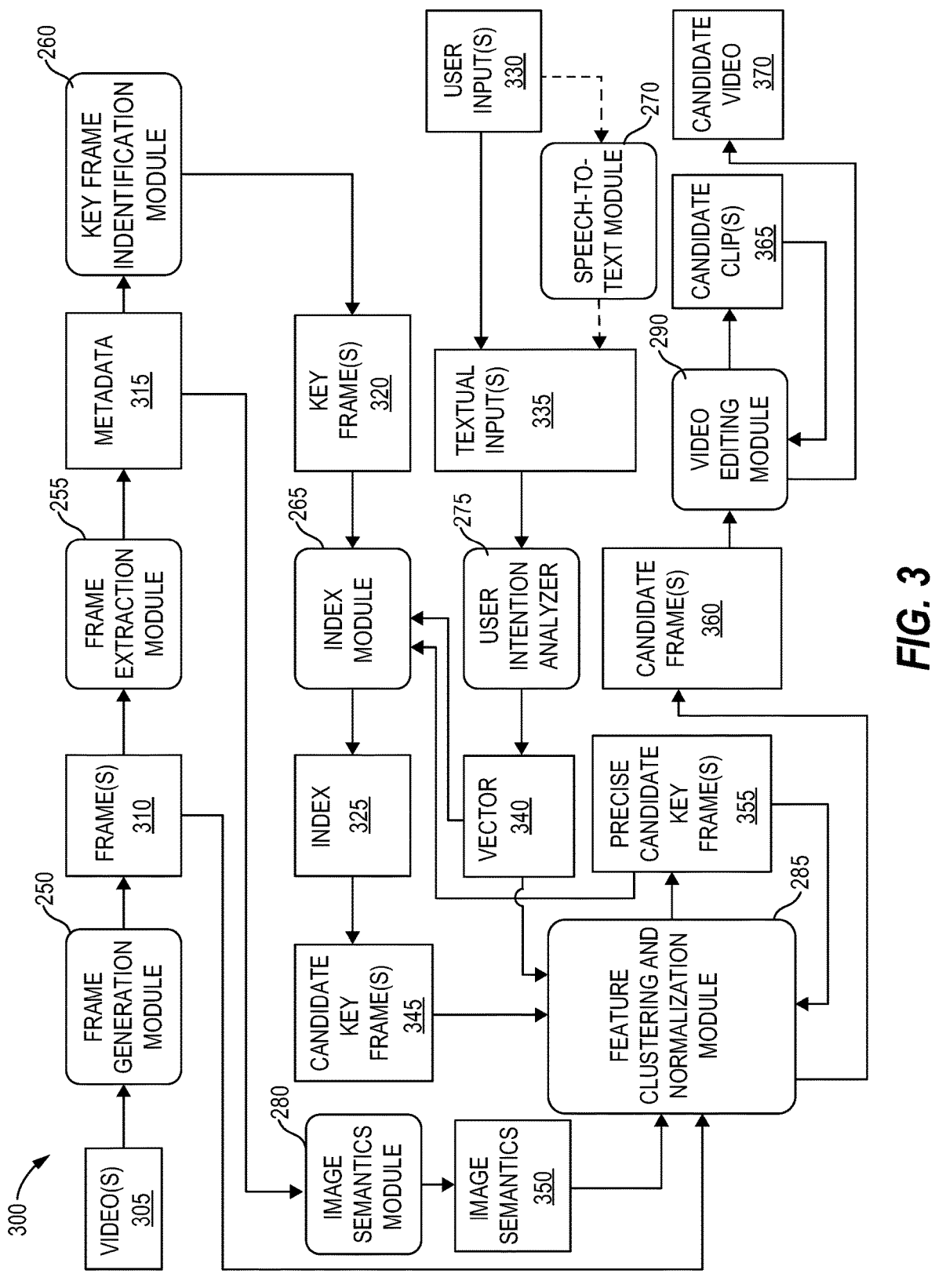
FIG. 3 depict an example workflow for the segmentation, indexing and clustering of videos guided by user inputs, according to some embodiments of the present disclosure.

In one embodiment, the frame generation module 250 may access the videos saved in the database 240, and divide each video into individual frames (e.g., 310 of FIG. 3). In some embodiments, the frame generation module 250 may scan through each video file (e.g., 305 of FIG. 3), and decode each video file into a series of individual frames (e.g., 310 of FIG. 3). As used herein, an individual frame may refer to a still image that represents a specific moment in time within the video, and the series of individual frames may represent the progress of images over the duration of the video. In some embodiments, each frame may be associated with a timestamp or time sequence, which indicates the specific time or sequence within the video. In some embodiments, the timestamp or time sequence is indicated in the frame identifier (e.g., frame_id) of each frame. In some embodiments, the frame generation module 250 may store the generated frames (e.g., 310 of FIG. 3) for each video into the database 240 or local storage 215 for further processing. In some embodiments, the frame generation module 250 may directly feed the generated frames (e.g., 310 of FIG. 3) to subsequent modules for feature extraction, key frame identification, indexing, and/or clustering.

In one embodiment, the feature extraction module 255 may receive individual video frames (e.g., 310 of FIG. 3), such as from the frame generation module 250. The feature extraction module 255 may process each frame to identify and extract relevant video features, using various image processing techniques. The relevant video features may include global and/or local features. In some embodiments, the global feature may include color distribution (e.g., RBG, HSV), texture patterns (e.g., LBP), brightness and contrast, gray scale, and other visual elements that can be used to understand the general characteristics of the frame. In some embodiments, the local feature may include interest points (e.g., scale-invariant feature transform (SIFT)), object shapes and boundaries, motion vectors, and other visual elements that can be used to characterize specific areas or objects within a frame.

In some embodiments, the feature extraction module 255 may generate metadata (also referred to in some embodiments as framemeta) (e.g., 315 of FIG. 3) for each frame, based on the extracted video features. For example, the metadata may include a video file identifier (e.g., file_id), a transformed frame identifier (e.g., frame_id), texture patterns, number of objects (e.g., num_obj), a description of objects identified in the frame (also referred to in some embodiments as image semantic description) (e.g., obj_des), LBP values (e.g., LBP_val), RGB vector (e.g., RGB_vec), HSV vector (HSV_vec), and/or hash value (e.g. hash_array). The metadata may include values for each extracted feature, which serve as quantitative representations of the frame's visual content for further comparison and analysis. In some embodiments, the feature extraction module 255 may associate the generated metadata with its respective video frame, and save it into the database 240 or local storage 215 for further processing. In some embodiments, the feature extraction module 255 may directly feed the generated metadata and/or its respective frame to subsequent modules for key frame identification, indexing, and/or clustering.

In one embodiment, the key frame identification module 260 may assess the similarity between different frames within the same video using the metadata generated by the feature extraction module 255, and identify key frames for the video. In some embodiments, the similarity may be determined based on one or more video features, including global and/or local features. One or more similarity measures may be used. For example, the similarity between different frames may be measured using cosine similarity, Euclidean distance, or correlation measures when one or more video features are mapped to a shared vector space. Based on the measured similarity, the key frame identification module 260 may identify key frames (e.g., 320 of FIG. 3) for each video. In some embodiments, the key frame identification module 260 may identify key frames by applying a clustering algorithm to group similar frames together. For example, the key frame identification module 260 may apply the clustering algorithm to all frames within the same video, and generate clusters of frames that share common visual characteristics. Once the clusters of frames have been generated, the key frame identification module 260 may select the most representative frames within each cluster (e.g., the center points of each cluster in the feature space) as the key frames for a respective video. In some embodiments, the key frame identification module 260 may save the key frames (e.g., 320 of FIG. 3) for each video and their metadata into the database 240 or local storage 215 for further processing. In some embodiments, the key frame identification module 260 may directly feed the key frames and their metadata to subsequent modules for indexing, clustering, and/or boundary positioning.

In one embodiment, the index module 265 may index the key frames based on their metadata. The generated index (e.g., 325 of FIG. 3) may include each key frame's sequence or timestamp (e.g., key frame array) with respect to the video from which the key frame was extracted, and/or the video feature values included within its respective metadata (e.g., the video file identifier, the frame identifier, texture patterns, number of objects, object descriptions, LBP values, RGB vector, HSV vector, and/or hash value.) In some embodiments, the index module 265 may save the index (e.g., 325 of FIG. 3) in the database 240 or local storage 215 for further processing. In some embodiments, the index module 265 may directly feed the index to subsequent modules for clustering, and/or boundary positioning.

In one embodiment, the user intention analyzer 275 may process one or more user inputs received from a user. The user may provide the inputs using the user devices (e.g., 245-1, 245-2). The user inputs may be provided in a variety of formats, including text, audio, image, or video. If the user inputs are not in text form (e.g., if the inputs include audio or video files), the user intention analyzer 275 may transfer these inputs to the speech-to-text module 270, which transcribes spoken language (e.g., audio commands, audio tracks within audio or video clips) into written text. In some embodiments, a machine learning model may be used to perform the speech-to-text conversion. The machine learning model may be trained using a large amount of audio data as input, and its corresponding text transcriptions as output. In some embodiments, the computing device 201 may further comprise a video-to-text module that detects and/or recognizes key objects within the user inputs (e.g., video clips, or images), and represent them in textual form.

After all user inputs have been converted into textual form, in one embodiment, the user intention analyzer 275 may process the textual data to infer the user's intentions. As herein, the user's intentions may include a variety of information, such as the user's search criteria, preferences or requirements, the user's interests in specific topics or concepts. Several techniques may be used to identify the user's intentions. For example, in some embodiments, the user intention analyzer 275 may utilize the natural language processing (NLP) techniques to perform semantic analysis, which involves extracting keywords or phrases (e.g., that represent key topics or concepts) in each input, understanding the relationships between keywords or phrases to correctly interpret the meaning, and/or ranking the keywords or phrases based on their importance within each input. In some embodiments, the importance of a word or phrase may be measured by the frequency of occurrence and/or the position within each input. In some embodiments, the user intention analyzer 275 may represent the user's intentions in a machine-readable format, such as a row vector (e.g., 340 of FIG. 3) generated based on the ranked keywords or phrases.

In one embodiment, the identified user intentions may subsequently be provided to the index module 265. Using these intentions, the index module 265 may filter through the index (e.g., 325 of FIG. 3) to identify a set of candidate key frames (e.g., 345 of FIG. 3) that potentially align with the user's specified intentions.

In one embodiment, the image semantics module 280 may process the metadata and/or the corresponding individual video frames to generate image semantics (e.g., 350 of FIG. 3) for each frame. The image semantics may represent a higher-level description of the content in each video frame, and may include one or more video features from the corresponding metadata in different combinations. For example, one set of image semantics may include textual patterns, number of objects (e.g., num_obj), a description of objects identified in the frame (also referred to in some embodiments as image semantic description) (e.g., obj_des), and LBP values (e.g., LBP_val), while another set of image semantics may include textual patterns, number of objects (e.g., num_obj), LBP values (e.g., LBP_val), and HSV vector (e.g., HSV_vec). In some embodiments, an individual video feature may server as the input in the process of performing video clustering. In other embodiments, the image semantics (e.g., a combination of two or more video features) may be used as references or inputs for clustering operations. The clustering operation may involve applying a clustering algorithm to identify frames similar to the candidate key frames. By using the image semantics as references, the similarity between different frames may be measured based on one or more video features. In some embodiments, each video feature within the image semantics may be assigned a different weight based on its relative importance and relevance to the identified user's intentions.

In one embodiment, the feature clustering and normalization module 285 may receive the candidate key frames and their corresponding metadata, as well as the other frames and their corresponding metadata. The feature clustering and normalization module 285 may first normalize different video features into a common scale for generating optimal results. This normalization may be especially useful when more than one video feature is used in comparing similarity between different frames because different video features (e.g., color, texture, or motion) may have vastly different scales and ranges. In some embodiments, video features may be adjusted to a common scale between 0 and 1. The normalization may ensure that each video feature contributes equally to the model's decision, thereby improving the efficiency and accuracy of the resulting clusters.

Once the normalization is complete, in some embodiments, the feature clustering and normalization module 285 may apply a clustering algorithm to check if other key frames (e.g., those not initially identified as relevant to the user's intentions) should be grouped with the candidate key frames. The feature clustering and normalization module 285 may use the candidate key frames (identified by the index module 265) as center points of clusters, evaluate each of the other frames, and assign each of the other key frames to the cluster (e.g., to the candidate key frame) that it is most similar to, according to the measured similarity. In some embodiments, the measured similarity used by the clustering algorithm may be based on a single video feature, such as color (e.g., RGB values), texture (e.g., LBP values), gray scale, object tracing (e.g., HSV values), scale (scale-invariant feature transforms (SIFT)), among others. In some embodiments, the measured similarity used by the clustering algorithm may be based on a combination of different video features, such as image semantics generated by the image semantics module 280. In some embodiments, the feature clustering and normalization module 285 may prioritize certain video features over others based on the identified user's intentions and/or historical data, and recommend the top-ranking feature as the leading feature in clustering the other key frames with the candidate key frames.

Based on the clustering results, in some embodiments, the feature clustering and normalization module 285 may generate a set of precise candidate key frames (e.g., 355 of FIG. 2). The set may include both the candidate key frames (e.g., 245 of FIG. 3) that were initially identified as relevant to the user's intentions, as well as the additional key frames that have been determined as relevant based on the clustering algorithm (e.g., falling within a defined threshold distance of a cluster center. In some embodiments, the information regarding the precise candidate key frames may then be updated to the index module 265. The index module 265 may integrate this optimized/tuned information into the index, thereby enhancing its capability to more accurately identify candidate key frames for future similar user intentions. Once the precise candidate key frames (e.g., 355 of FIG. 3) have been identified, the feature clustering and normalization module 285 may run the clustering algorithm a second time (or run a new clustering algorithm), using the precise candidate key frames as new center points. This time, the algorithm may be used to evaluate all other non-key frames to determine their similarity to these precise candidate key frames (e.g., center points). In some embodiments, a predefined similarity threshold between frames and their respective nearest precise candidate key frames (e.g., new center points) may be established to ensure the selected non-key frames are sufficiently relevant to the user's intentions. As such, non-key frames that exhibit a high degree of visual similarity to the precise candidate key frames and pass the predefined similarity threshold are then grouped together. These selected non-key frames, along with their corresponding precise candidate key frames, may be referred to as the candidate frames (e.g., 360 of FIG. 3), which are subsequently processed to create a series of continuous video clips (e.g., 365 of FIG. 3).

In some embodiments, the feature clustering and normalization module 285 may identify a candidate key frame as an outlier during the clustering process. For example, a candidate key frame may be classified as an outlier when the candidate key frame is significantly different from the majority of other candidate key frames, and/or when no other frames share significant similarities to this candidate key frame (e.g., no other frames should be grouped together with this candidate key frame). Under these circumstances, the feature clustering and normalization module 285 may exclude this outlier key frame from further calculations to ensure the clustering results are not skewed and the resulting video remains coherent and representative of the user's intentions.

In some embodiments, the feature clustering and normalization module 285 may use the candidate key frames (e.g., 345 of FIG. 3) as center points of clusters, and apply a clustering algorithm to all other frames (including key frames that are not initially identified as relevant to the user's intentions, and non-key frames) to check if they are visually similar to the candidate key frames (e.g., falling inside their respective cluster) and sufficiently relevant to the user's intentions (e.g., surpassing the defined similarity threshold). That is, the system may perform a single clustering operation on the candidate keys to find the other relevant, rather than the two-cluster operation discussed above.

In one embodiment, the video editing module 290 may process the candidate frames (e.g., 360 of FIG. 3) to generate a series of one or more continuous video clips (e.g., 365 of FIG. 3). In some embodiments, the candidate frames may include the candidate key frames that were initially identified as relevant to the user's intentions (e.g., 345 of FIG. 3), the additional key frames that have been determined as relevant based on the first clustering results, as well as the additional non-key frames that have been determined as relevant based on the second clustering results. In some embodiments, the candidate frames may include the candidate key frames that were initially identified as relevant to the user's intentions (e.g., 345 of FIG. 3), as well as the additional frames (including both key frames and non-key frames) that have been determined as relevant based on a single clustering result. In some embodiments, the video editing module 290 may stitch the series of continuous video clips together to create a full, single video and transmit it to the user devices (e.g., 245-1, 245-2).

FIG. 3 depicts an example workflow 300 for the segmentation, indexing, and clustering of videos guided by user inputs, according to some embodiments of the present disclosure. In some embodiments, the workflow 300 may be performed by one or more computing devices, such as the computer 101 as illustrated in FIG. 1, and/or the computing device 201 as illustrated in FIG. 2. Though depicted as discrete components for conceptual clarity, in some embodiments, the operations of the depicted components (and others not depicted) may be combined or distributed across any number and variety of components, and may be implemented using hardware, software, or a combination of hardware and software.

In the illustrated example, one or more videos 305 saved in a database (e.g., 240 of FIG. 2) are provided to the frame generation module 250. The frame generation module 250, upon receiving the videos 305, scans and divides each video into a series of individual frames 310. As discussed above, in some embodiments, the individual frame may refer to a still image that represents a specific moment within the video, and the series of individual frames may represent the progress of images over the duration of the video. In some embodiments, each individual frame may be associated with a timestamp or time sequence, which indicates the specific time or sequence within the video.

In the illustrated example, the generated individual frames 310 are transmitted to the feature extraction module 255, which processes each frame to extract relevant video features. The relevant video features may include both global and/or local features. In some embodiments, the global feature may include color distribution (e.g., RBG, HSV), texture patterns (e.g., LBP), brightness and contrast, gray scale, and other visual elements that can be used to understand the general characteristics of the frame. In some embodiments, the local feature may include interest points (e.g., scale-invariant feature transform (SIFT)), object shapes and boundaries, motion vectors, and other visual elements that can be used to characterize specific areas or objects within a frame.

In the illustrated example, once the relevant video features for each frame have been extracted, the feature extraction module 255 then proceeds to generate metadata (also referred to in some embodiments as framemeta) (e.g., 315) for each frame. As discussed above, the metadata may include various pieces of information about a frame. For example, in some embodiments, the metadata may include a video file identifier (e.g., file_id), a transformed frame identifier (e.g., frame_id), texture patterns, number of objects (e.g., num_obj), a description of objects identified in the frame (also referred to in some embodiments as image semantic description) (e.g., obj_des), LBP values (e.g., LBP_val), RGB vector (e.g., RGB_vec), HSV vector (HSV_vec), and/or hash value (e.g. hash_array). In the illustrated example, the generated metadata 315 (e.g., along with their respective frames 310) is provided to subsequent modules (e.g., the key frame identification module 260, the image semantics module 280, or the feature clustering and normalization module 285) for further processing, as discussed in more detail below.

In the illustrated example, the metadata 315 (e.g., along with their respective frames 310) is provided to the key frame identification module 260 to identify key frames 320 for each video. The key frame identification module 260 may evaluate the similarities between different frames within the same video, and identify key frames based on these similarities. In some embodiments, the similarities between different frames may be determined using one or more video features and their corresponding values, which are contained within each frame's metadata.

In the illustrated example, the index module 265 receives the key frames 320 and generates an index 325 for all key frames based on their metadata. The generated index 325 may include each key frame's sequence or timestamp (e.g., key frame array), and the video feature values contained within each key frame's respective metadata, including but not limited to a video file identifier (e.g., file_id), a transformed frame identifier (e.g., frame_id), texture patterns, number of objects (e.g., num_obj), a description of objects identified in the frame (also referred to in some embodiments as image semantic description) (e.g., obj_des), LBP values (e.g., LBP_val), RGB vector (e.g., RGB_vec), HSV vector (HSV_vec), and/or hash value (e.g. hash_array).

In the illustrated example, user inputs 330 are also received. If the received user inputs 330 are not in textual form (e.g., the inputs include audio or video files), the user inputs may first be processed by the speech-to-text module 270, which converts the audio data (e.g., audio commands, audio tracks within audio or video clips) into written text (e.g., textual inputs 335). In some embodiments, the speech-to-text module 270 may include one or more machine learning models that are trained using a large amount of audio data and their corresponding text descriptions. In some embodiments, the user inputs that include video clips or images may also be provided to a video-to-text module, which detects and/or recognizes key objects within the video clips or images, and represents them in textual form.

In the illustrated example, the user intention analyzer 275 receives the textual inputs 335, and interprets the inputs to identify the user's intentions. Several techniques may be used to identify the user's intentions. As discussed above, in some embodiments, NLP techniques may be used by the user intention analyzer 275 to perform semantic analysis, including extracting keywords or phrases (e.g., that represent key topics or concepts) in each input, identifying the relationships between keywords or phrases to interpret the meaning, and ranking the keywords or phrases based on their importance within each input. As illustrated, the output of the user intention analyzer 275 is a row vector 340, which represents the user's intentions based on the ranked keywords or phrases.

In the illustrated example, the vector 340 that represents the user's intentions is provided to the index module 265, which, based on the vector 340, searches through the index 325 to identify a set of candidate key frames 345. In some embodiments, the set of candidate key frames may refer to the key frames that are considered potentially relevant or align with the user's intentions. The identified candidate key frames are then provided to the feature clustering and normalization module 285 for further processing.

In the illustrated example, the candidate key frames 345 and their corresponding metadata, as well as the other frames 310 and their corresponding metadata, are provided by the feature clustering and normalization module 285. The feature clustering and normalization module 285, upon receiving the frames and metadata, may first normalize different video features within the metadata into a common scale. The normalization may ensure that each video feature contributes equally to the model's decision, thereby improving the efficiency and accuracy of the resulting clusters. Upon the normalization is complete, the feature clustering and normalization module 285 may use the candidate key frames as center points, and apply a clustering algorithm to all other key frames in the database (e.g., those were not initially identified as relevant to the user's intentions) to check if the other key frames are visually similar to the candidate key frames, and thus, should be grouped together with the candidate key frames.

Based on the clustering result, as illustrated, the feature clustering and normalization module 285 generates a set of precise candidate key frames 355, as discussed above. In the illustrated example, the set of precise candidate key frames 355 is updated to the index module 265, improving its capability to more accurately identify candidate key frames when similar user intentions are received in the future.

In the illustrated example, the feature clustering and normalization module 285 runs the clustering algorithm a second time (or runs a new clustering algorithm), using the precise candidate key frames 355 as new center points. During the second run, the clustering algorithm may be applied to all other non-key frames (e.g., frames 310) to determine their similarity to these precise candidate key frames. Non-key frames that show a high degree of visual similarity to the precise candidate key frames and exceed a predefined similarity threshold (set to ensure alignment with the user's intentions) are grouped together to create a set of candidate frames 360. Generally, the clustering algorithms used to group the frames may include k-means clustering, mean-shift clustering, density-based spatial clustering of applications with noise (DBSCAN), hierarchical clustering, spectral clustering, or any other suitable clustering algorithms.

In the illustrated example, the set of candidate frames 360 is then transmitted to the video editing module 290, which creates a series of continuous video clips 365 for the candidate frames 360. The process of generating continuous video clips 365 may include several steps. For example, in some embodiments, the video editing module 290 may first delete frames that are outliers, that fall outside their respective clusters, and/or whose similarity to their respective center points (e.g., the precise candidate key frames 355) does not pass the predefined similarity threshold. This process ensures that only the frames that are sufficiently relevant to the user's intentions and visually close to the precise candidate key frames 355 are included in the final video output. After the irrelevant frames have been deleted, the video editing module 290 may then proceed to reorder the remaining frames (e.g., the candidate frames 360) within each cluster according to their timestamp or time sequence in the original video, to maintain the continuity and narrative coherence of the original video. After that, the video editing module 290 may concatenate the reordered frames within each cluster to create a continuous video clip 365. Each video clip 365 may have a defined start point and end point, and represent a segment of the original video that matches the user's intentions. In some embodiments, the process may be repeated for each cluster and for each precise candidate key frame 355, generating a set of continuous video clips 365 from different videos that are all align with the user's intentions. In some embodiments, the continuous video clips may be provided individually to the user. In the illustrated example, the video editing module 290 may stitch these clips 365 together to create a full video and transmit it to the user devices (e.g., 245-1, 245-2).

In some embodiments, the visual similarity may be measured based on a single video feature, such as color (e.g., RGB values), texture (e.g., LBP values), gray scale, object tracing (e.g., HSV values), scale (scale-invariant feature transforms (SIFT)), among others. In some embodiments, the visual similarity used by the clustering algorithm may be based on a combination of different video features, such as image semantics 350 generated by the image semantics module 280. As discussed above, the image semantics 350 may include one or more video features from the corresponding metadata in different combinations, and may be used as a reference for comparing similarity between different frames. In some embodiments, the feature clustering and normalization module 285 may prioritize certain video features over others based on the identified user's intentions and/or historical data, and recommend the top-ranking feature as the leading feature in clustering other frames with the candidate key frames. For example, if a user is seeking a guidance video for an open skull operation, the user inputs may include words or phrases like "surgery," "open skull," "techniques," and/or "procedure." By performing relevant semantic analysis on the user inputs, the user intention analyzer 275 may infer that the user is primarily interested in the detailed procedures and techniques used in the open skull operation. The user intention analyzer 275 may represent the intentions in the vector 340, and transmit it to the feature clustering and normalization module 285. The feature clustering and normalization module 285, based on the interpretation of the user inputs vector and/or analysis of historical data, may determine that the object tracing feature (which focuses on the detailed movement of objects within a frame) would be more relevant and effective than other features to capture the precise details of the surgical process. Therefore, the feature clustering and normalization module 285 may recommend that the user selects the object tracing feature as the leading feature in the video clustering process. In some embodiments, the feature clustering and normalization module 285 may apply the recommended leading feature automatically in the process of video clustering (rather than waiting for user approval or confirmation). In some embodiments, the historical data may include past user inputs, the specific video features used for each input, and the corresponding clustering outcomes resulting from these features.

Figure 4:
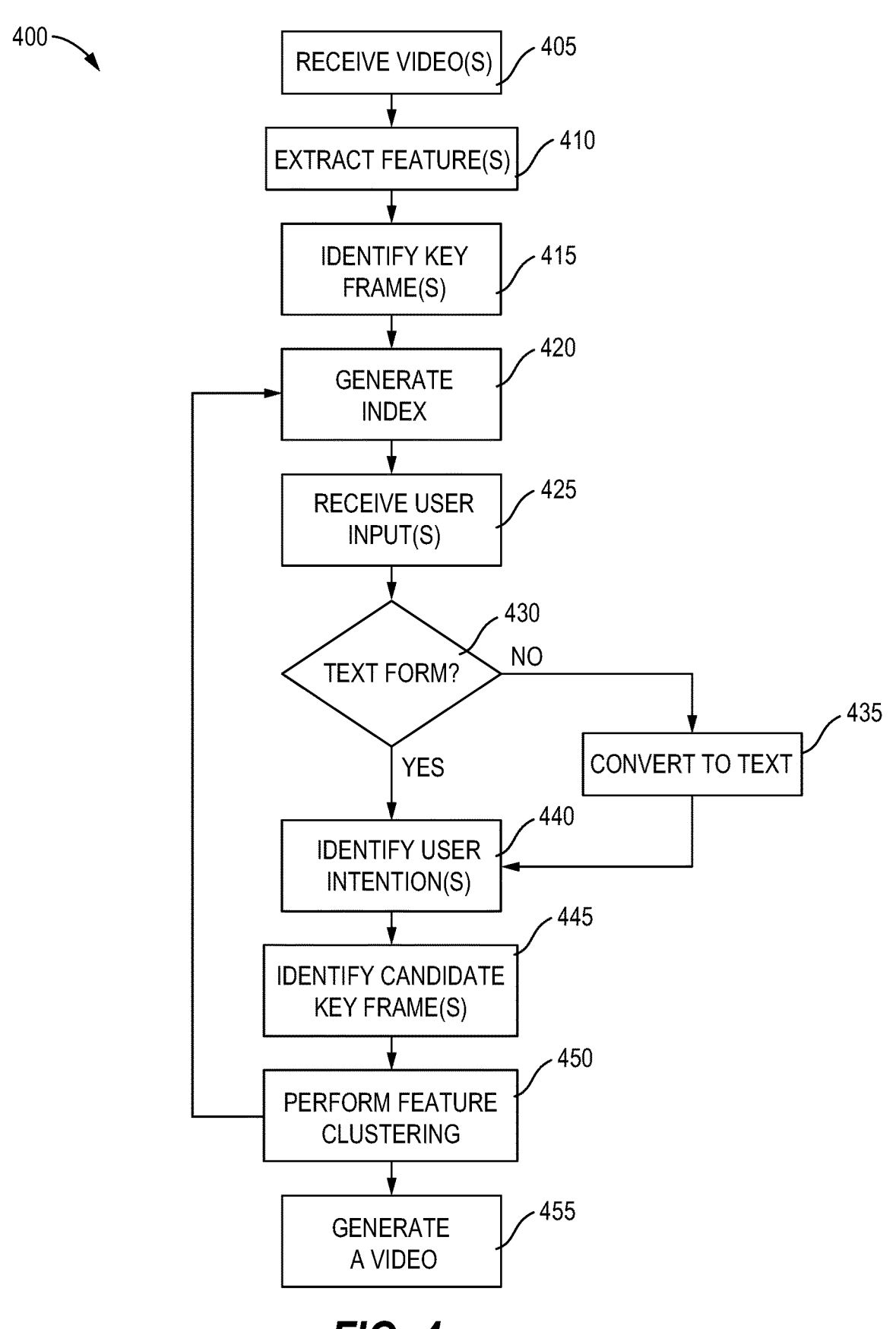
FIG. 4 depicts an example method for video searching and clustering based on user inputs, according to some embodiments of the present disclosure.

FIG. 4 depicts an example method 400 for video searching and clustering based on user inputs, according to some embodiments of the present disclosure. In some embodiments, the method 400 may be performed by one or more computing devices, such as the computer 101 as illustrated in FIG. 1, and/or the computing device 201 as illustrated in FIG. 2.

The method 400 begins at block 405, where a computing system accesses one or more videos. The videos may be saved in a remote dataset (e.g., 240 of FIG. 2), and may be accessed and retrieved by the computing system via a network connection (e.g., 210 of FIG. 2), such as the Internet. Each of the videos may be divided into a series of individual frames (e.g., 310 of FIG. 3) for further processing. A frame of a video may refer to a still image that forms part of the sequence of images that make up the video.

At block 410, the computing system analyzes each individual frame (e.g., 310 of FIG. 3) to identify and extract one or more relevant video features. The relevant video features may include global and/or local features. In some embodiments, the computing system may generate metadata (also referred to in some embodiments as framemeta) (e.g., 315 of FIG. 3) for each frame based on the extracted video features.

At block 415, the computing system calculates the similarity between different frames within the same video, and identifies key frames (e.g., 320 of FIG. 3) for each video. In some embodiments, key frames in a video may refer to frames that contain important information or depict critical moments in the video sequence, and/or frames that represent substantial changes in content. Various methods may be used to identify key frames. For example, in some embodiments, the computing system may calculate similarity between different frames, and apply a clustering algorithm to group similar frames together. When the groups/clusters of similar frames are generated, the system may select the most representative frames within each group/cluster (e.g., the center points of each cluster in the feature space) as the key frames for the video.

At block 420, the computing system indexes the key frames (e.g., 320 of FIG. 3) for further filtering, clustering, and boundary positioning based on user inputs. The generated index (e.g., 325 of FIG. 3) may include each key frame's sequence or timestamp, and/or the video feature values included within its respective metadata.

At block 425, the computing system receives user inputs (e.g., 330 of FIG. 3). The user inputs may be sent from the user devices (e.g., 245-1, 245-2 of FIG. 2). The user inputs may be provided in a variety of formats. For example, the user inputs may include a textual query, such as natural language query, keyword search, Boolean search, among others. In some embodiments, the user inputs may include an audio file, such as vocal instruction given by a user to interact with a device, an audio recording, or a voice message. In some embodiments, the user inputs may include an image. In some embodiments, the user inputs may include a video file, such as meeting recording, or video message.

At block 430, the computing system determines whether the received user inputs (e.g., 330 of FIG. 3) are in textual form. If the user inputs are in textual form, the method proceeds to block 440. If the user inputs are not in textual form, the method proceeds to block 435, where the computing system converts the user inputs into textual form (e.g., 335 of FIG. 3). For example, in some embodiments, when the user inputs include audios and/or videos, the computing may extract audio tracks from the audios and/or videos, and transcribe the spoken language into written text. In some embodiments, when the user inputs include videos and/or images, the computing may identify key objects within the videos and/or images using object recognition techniques, and represent them in written text.

At block 440, the computing system processes the textual data form (e.g., 335 of FIG. 3) to infer the user's intentions. As herein, the user's intentions may include a variety of information, such as the user's search criteria, preferences and requirements, the user's interests in specific topics or concepts. As discussed above, in some embodiments, NLP techniques may be used by the user intention analyzer 275 to perform semantic analysis, including extracting keywords or phrases (e.g., that represent key topics or concepts) in each input, identifying the relationships between keywords or phrases to correctly interpret the meaning, and ranking the keywords or phrases based on their importance within each input. In some embodiments, the importance of a word or phrase may be measured by the frequency of occurrence and/or the position within each input. In some embodiments, the computing system may represent the user's intentions in a machine-readable format, such as a row vector (e.g., 340 of FIG. 3) generated based on the ranked key words or phrases. For example, a user may provide the text input "I want to know about asset criticality and health matrix capability for matrix of next year." The system may process the user input and identify keywords as "asset," "criticality," "health," and "matrix." The system may then check an existing dictionary of words and put "1" in the row vector if a word from the dictionary is present in the user's input. In the given example, the word "matrix" appears twice, while the words "asset," "criticality," and "health," each appears once. Therefore, the row vector for the user input would be: [1, . . . 1, . . . 1, . . . 2, . . . ].

At block 445, the computing system may filter the index based on the identified user's intentions. The computing system may identify a set of candidate key frames (e.g., 345 of FIG. 3) that are relevant or align with the user's intentions.

At block 450, the computing system performs feature clustering. In some embodiments, the computing system may first use the candidate key frames as center points, and apply a clustering algorithm to all key frames. The first clustering process may check if other key frames (e.g., those frames that were not initially identified as relevant to the user's intentions) are visually similar to the candidate key frames, and thus should be grouped together. If additional key frames are identified as sufficiently similar to the candidate key frames, the computing system may generate a set of precise candidate key frames (e.g., 355 of FIG. 3). In some embodiments, the method 400 may return to block 420, where the computing system integrates the optimized/tuned information regarding the precise candidate key frames into the index. After the precise candidate key frames are identified, the computing system may move to run the clustering algorithm a second time (or run a new clustering algorithm), using the precise candidate key frames as new center points and applying the algorithm to all other non-key frames. The computing system may assign each of the non-key frames to the cluster (e.g., the precise candidate key frames) that it is most similar to, based on the selected similarity measure. In some embodiments, a predefined similarity threshold between frames and their respective center points (e.g., the precise candidate key frames) may be set up. The computing system may select non-key frames as candidate frames only if they fall within a respective cluster and their similarities to the cluster's center points exceed the predefined similarity threshold.

At block 455, the computing system generates a video that aligns with the user's intentions based on the selected candidate frames (e.g., 360 of FIG. 3). In some embodiments, the candidate frames may include the candidate key frames that were initially identified as relevant to the user's intentions (e.g., 345 of FIG. 3), the additional key frames that have been determined as relevant based on the first clustering results, as well as the additional non-key frames that have been determined as relevant based on the second clustering results.

FIG. 5 is a flow diagram depicting an example method 500 for user-driven video segment clustering and boundary positioning, according to some embodiments of the present disclosure.

The method 500 begins at block 505, where a system (e.g., the computer 101 of FIG. 1, or the computing device 201 of FIG. 2) accesses a plurality of videos (e.g., 305 of FIG. 3).

At block 510, the system generates an index (e.g., 325 of FIG. 3) for the plurality of videos based on one or more key frames (e.g., 320 of FIG. 3) and one or more video features extracted from each respective video of the plurality of videos. In one embodiment, the one or more video features may include global features and/or local features. In some embodiments, the global feature may include color distribution (e.g., RBG, HSV), texture patterns (e.g., LBP), brightness and contrast, gray scale, and other visual elements that can be used to understand the general characteristics of the frame. In some embodiments, the local feature may include interest points (e.g., scale-invariant feature transform (SIFT), object shapes and boundaries, motion vectors, and other visual elements that can be used to characterize specific areas or objects within a frame.

At block 515, the system processes a user input (e.g., 330 of FIG. 3) to identify the user intentions. In one embodiment, the system may represent the user intentions as a row vector (e.g., 340 of FIG. 3). In one embodiment, the system may first convert the user input into textual data (e.g., 335 of FIG. 3), and process the textual data to predict the user intentions, using a trained machine learning model. In some embodiments, the user inputs may be provided in a variety of formats, such as text queries, audio files, images, or video files.

At block 520, the system filters the index (e.g., 325 of FIG. 3), based on the user intentions, to identify a plurality of candidate key frames (e.g., 345 of FIG. 3). In one embodiment, the plurality of candidate key frames (e.g., 345 of FIG. 3) correspond to one or more candidate videos within the plurality of videos (e.g., 305 of FIG. 3).

At block 525, the system generates a recommended video (e.g., 370 of FIG. 3) based on the plurality of candidate key frames (e.g., 345 of FIG. 3). The process of generating the recommended video (e.g., 370 of FIG. 3) includes: selecting one or more additional frames (e.g., 360 of FIG. 3) based on processing the plurality of candidate key frames (e.g., 345 or 355 of FIG. 3) using one or more clustering operations, and aggregating the plurality of candidate key frames and the one or more additional frames. In some embodiments, the process of selecting one or more additional frames based on processing the plurality of candidate key frames using one or more clustering operations include: for each candidate key frame from a respective candidate video, identifying the one or more additional frames from the respective candidate video upon determining that a similarity between each of the one or more additional frames and the candidate key frame exceeds a defined threshold, and clustering the candidate key frame with the one or more additional frames from the respective candidate video to generate a video clip (e.g., 365 of FIG. 3). In some embodiments, prior to generating the recommended video based on the plurality of candidate key frames, the system may recommend one or more leading video features from the one or more video features extracted from each respective video based at least in part on the user intentions. The leading video features may then be used to measure the similarity between each of the one or more additional frames and its respective candidate key frame, to determine if they should be grouped together to generate a series of continuous clips. In some embodiments, the leading video features may include color, brightness, texture, gray scale, object tracing, scale-invariant feature transform (SIFT), or image semantics data. In some embodiments, prior to the prior to generating the recommended video based on the plurality of candidate key frames, the system may tune the plurality of candidate key frames to generate a set of precise candidate key frames (e.g., 355 of FIG. 3). The system may delete a candidate key frame if it determines that the candidate key frame is an outliner among the other candidate key frames. The system may add one or more key frames (e.g., those not initially identified as relevant to the user's intentions) upon determining that the one or more key frames are visually similar to the candidate key frames. In some embodiments, the system may generate a continuous video clip (e.g., 365 of FIG. 3) by combining the plurality of candidate key frames (e.g., 345 or 355 of FIG. 3) and the one or more additional frames (e.g., 360 of FIG. 3). In some embodiments, the continuous video clip (e.g., 365 of FIG. 3) may have a defined start point and end points, and/or represent a segment of the original video that matches the user's intentions.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present invention, other and further embodiments of the invention may be devised without departing from the basic scope thereof, and the scope thereof is determined by the claims that follow.

What is claimed is:

1. A method comprising:
accessing a plurality of videos;

generating an index for the plurality of videos based on one or more key frames and one or more video features extracted from each respective video of the plurality of videos;

processing a user input to identify user intentions;

filtering the index to identify a plurality of candidate key frames based on the user intentions;

performing a two-layer clustering operation to select one or more additional frames, the two-layer clustering operation comprising:

generating a plurality of precise candidate key frames by using each candidate key frame as a center point to identify visually similar key frames from the one or more key frames of the plurality of videos, and identifying one or more non-key frames from corresponding candidate videos by using each precise candidate key frame as a new center point; and generating a recommended video by aggregating the plurality of precise candidate key frames and the one or more non-key frames.

2. The method of claim 1, wherein processing a user input to identify user intentions comprises:

converting the user input into textual data; and processing the textual data to predict the user intentions using natural language processing (NLP) techniques.

3. The method of claim 1, wherein the user input comprises at least one of a textual query, an audio file, an image, or a video file, and wherein the user intentions are represented as a row vector.

4. The method of claim 1, wherein using each precise candidate key frame as a new center point to identify one or more non-key frames from corresponding candidate videos comprises:

for each precise candidate key frame from a respective candidate video, identifying the one or more non-key frames from the respective candidate video upon determining that a similarity between each of the one or more non-key frames and the precise candidate key frame exceeds a defined threshold, and clustering the precise candidate key frame with the one or more non-key frames from the respective candidate video to generate a video clip.

5. The method of claim 1, wherein the one or more key frames for each respective video of the plurality of videos are determined by:

dividing each respective video into a plurality of frames;

extracting the one or more video features from each respective frame of the plurality of frames;

clustering the plurality of frames based on similarities between different frames of the plurality of frames, wherein the similarities are determined based on the one or more video features extracted from each respective frame; and identifying one or more cluster centers as the one or more key frames to present each respective video.

6. The method of claim 1, wherein the one or more video features extracted from each respective video comprises at least one of a global feature, or a local feature.

7. The method of claim 1, further comprising:

prior to generating the recommended video, recommending one or more leading video features from the one or more video features extracted from each respective video based on at least in part on the user intentions.

8. The method of claim 7, wherein the one or more non-key frames are selected based on the one or more recommended leading video features.

9. The method of claim 7, wherein the one or more recommended leading video features comprise at least one of (i) color, (ii) brightness, (iii) texture, (iv) gray scale, (v) object tracing, (vi) scale-invariant feature transform (SIFT), or (vii) image semantics data.

10. The method of claim 1, further comprising:

prior to generating the recommended video, modifying the plurality of candidate key frames, further comprising:

removing a candidate key frame of the plurality of candidate key frames upon determining that the candidate key frame is an outlier among the plurality of candidate key frames.

11. A system comprising:

one or more computer processors; and one or more memories collectively containing one or more programs which when executed by the one or more computer processors performs an operation, the operation comprising:

accessing a plurality of videos;

generating an index for the plurality of videos based on one or more key frames and one or more video features extracted from each respective video of the plurality of videos;

processing a user input to identify user intentions;

filtering the index to identify a plurality of candidate key frames based on the user intentions;

performing a two-layer clustering operation to select one or more additional frames, the two-layer clustering operation comprising:

generating a plurality of precise candidate key frames by using each candidate key frame as a center point to identify visually similar key frames from the one or more key frames of the plurality of videos, and identifying one or more non-key frames from corresponding candidate videos by using each precise candidate key frame as a new center point; and generating a recommended video by aggregating the plurality of precise candidate key frames and the one or more non-key frames.

12. The system of claim 11, wherein processing a user input to identify user intentions comprises:

converting the user input into textual data; and processing the textual data to predict the user intentions using natural language processing (NLP) techniques.

13. The system of claim 11, wherein the user input comprises at least one of a textual query, an audio file, an image, or a video file, and wherein the one or more video features extracted from each respective video comprises at least one of a global feature, or a local feature.

14. The system of claim 11, wherein using each precise candidate key frame as a new center point to identify one or more non-key frames from corresponding candidate videos comprises:

for each precise candidate key frame from a respective candidate video, identifying the one or more non-key frames from the respective candidate video upon determining that a similarity between each of the one or more non-key frames and the precise candidate key frame exceeds a defined threshold, and clustering the precise candidate key frame with the one or more non-key frames from the respective candidate video to generate a video clip.

15. The system of claim 11, wherein the operation further comprises:

prior to generating the recommended video based on the plurality of candidate key frames, recommending one or more leading video features from the one or more video features extracted from each respective video based on at least in part on the user intentions.

16. The system of claim 15, wherein the one or more additional frames are selected based on the one or more recommended leading video features.

17. The system of claim 15, wherein the one or more recommended leading video features comprise at least one of (i) color, (ii) brightness, (iii) texture, (iv) gray scale, (v) object tracing, (vi) scale-invariant feature transform (SIFT), or (vii) image semantics data.

18. The system of claim 11, wherein the operation further comprises:

prior to generating a recommended video, modifying the plurality of candidate key frames, further comprising:

removing a candidate key frame of the plurality of candidate key frames upon determining that the candidate key frame is an outlier among the plurality of candidate key frames.

19. A computer program product comprising one or more computer-readable storage media collectively containing computer-readable program code that, when executed by operation of one or more computer processors, performs an operation comprising:

accessing a plurality of videos;

generating an index for the plurality of videos based on one or more key frames and one or more video features extracted from each respective video of the plurality of videos;

processing a user input to identify user intentions;

filtering the index to identify a plurality of candidate key frames based on the user intentions;

performing a two-layer clustering operation to select one or more additional frames, the two-layer clustering operation comprising:

generating a plurality of precise candidate key frames by using each candidate key frame as a center point to identify visually similar key frames from the one or more key frames of the plurality of videos, and identifying one or more non-key frames from corresponding candidate videos by using each precise candidate key frame as a new center point; and generating a recommended video by aggregating the plurality of precise candidate key frames and the one or more non-key frames.

20. The computer program product of claim 19, wherein processing a user input to identify user intentions comprises:

converting the user input into textual data; and processing the textual data to predict the user intentions using natural language processing (NLP) techniques.

* * * * *